(12) United States Patent
Cencer

(10) Patent No.: US 6,312,398 B1
(45) Date of Patent: Nov. 6, 2001

(54) ACTUATOR FOR FLEXING A RESILIENT COVERING

(75) Inventor: Daniel George Cencer, League City, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 08/786,842

(22) Filed: Dec. 26, 1996

(51) Int. Cl.[7] .............................. A61H 01/00; A61H 01/02
(52) U.S. Cl. .................................................. 601/40; 601/33
(58) Field of Search .................... 623/24, 25; 601/40, 601/33; 414/5, 4; 607/48, 49

(56) References Cited

U.S. PATENT DOCUMENTS

| | | | |
|---|---|---|---|
| 1,880,138 | * 9/1932 | Hübl | 212/290 |
| 3,213,573 | 10/1965 | Bohr et al. . | |
| 3,242,567 | 3/1966 | Adam et al. . | |
| 3,358,678 | * 12/1967 | Kultsar | 601/23 |
| 3,449,769 | * 6/1969 | Mizen | 623/26 |
| 3,535,711 | * 10/1970 | Fick | 623/26 |
| 4,246,661 | 1/1981 | Pinson . | |
| 4,302,138 | * 11/1981 | Zarudiansky | 414/5 |
| 4,386,485 | 6/1983 | Kramer . | |
| 4,444,205 | 4/1984 | Jackson . | |
| 4,557,257 | * 12/1985 | Fernandez | 602/5 |
| 4,575,297 | * 3/1986 | Richter | 414/5 |
| 4,613,139 | 9/1986 | Robinson, II . | |
| 4,740,126 | * 4/1988 | Richter . | |
| 4,842,607 | 6/1989 | Repperger et al. . | |
| 4,872,665 | * 10/1989 | Chareire | 482/51 |
| 4,988,981 | 1/1991 | Zimmerman et al. . | |
| 5,047,952 | 9/1991 | Kramer et al. . | |
| 5,058,506 | 10/1991 | Swan . | |
| 5,086,785 | 2/1992 | Gentile et al. . | |
| 5,097,252 | 3/1992 | Harvill et al. . | |
| 5,143,505 | * 9/1992 | Burdea et al. . | |
| 5,178,137 | * 1/1993 | Goor | 601/5 X |
| 5,280,265 | 1/1994 | Kramer et al. . | |
| 5,282,460 | * 2/1994 | Boldt | 601/13 |
| 5,354,162 | * 10/1994 | Burdea | 414/5 |
| 5,376,128 | 12/1994 | Bozeman, Jr. . | |
| 5,409,447 | * 4/1995 | Wedge, Jr. . | |
| 5,447,403 | * 9/1995 | Engler | 414/4 |
| 5,458,655 | 10/1995 | Bozeman, Jr. . | |
| 5,516,249 | * 5/1996 | Brimhall | 414/5 |
| 5,631,861 | * 5/1997 | Kramer | 414/5 X |

FOREIGN PATENT DOCUMENTS

| | | |
|---|---|---|
| 615-925 | 2/1977 | (SU) . |
| 001637800 | * 3/1991 | (SU) ..................................... 601/40 |

OTHER PUBLICATIONS

John A. Main et al, "Power Assist EVA Glove Development", 22nd Int'l. Conference on Environmental Systems, Seattle WA (Jul. 1992).*

B. Shields, S. Peterson, A. Strauss, J. Main, "Design and Control of a Hand Exoskeleton for Use in Extravehicular Activity," Paper #IAF/IAA–93–I.5.252, 44th Congress of the International Astronautical Federation, pp. 1–9, Oct. 16–22, 1993, Graz, Austria.

David Cadogan and David Graziosi, ILC Dover, Inc., "Recent Advances in the Development of Spacesuit Gloves," SAE 26th International Conference on Environmental Systems, Monterey, CA, pp. 1, 9–11, Jul. 8–11, 1996.

* cited by examiner

Primary Examiner—Justine R. Yu
(74) Attorney, Agent, or Firm—James M. Cate

(57) ABSTRACT

The present invention provides a power assisted actuator assembly for flexing restraints in response to movement of an underlying member or a controller. The actuator assembly generally includes a flexible member, such as a cord or fabric panel, having a first end coupled to the restraint and a second end coupled to a drive member, such as a drive roller or winch. The drive member, which may be located remotely or locally, pulls on the flexible member to flex the restraint. The actuator assemblies are useful in many applications, including space suit gloves and compliant robot arms.

18 Claims, 11 Drawing Sheets

ACTUATOR FOR FLEXING A RESILIENT COVERING

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention relates to assisted movement of a flexible membrane or restraint. More particularly, the invention relates to the controlled movement of a restraint using a power-assisted actuator.

2. Background of the Related Art

Coverings or restraints are necessary or beneficial in many applications to protect underlying members. When the underlying member has a moveable component, such as a hinged lid, arm or joint, it is generally desirable for the restraint to move along with the component. Depending upon the application, the restraint itself can be hinged or sufficiently oversized to avoid restricting movement of the component. However, it is often also desirable for the restraint to be substantially conformal to the component. For example, body suits and gloves used to protect a person from natural or induced hostile environments preferably have restraint layers fashioned to fit closely or conformally to the relevant body member so that the suit does not prevent or hinder performance of a task.

When discussing the movement of a body member, it is often useful to describe the movement by reference to the jointed motion. For example, when a joint, such as the human elbow, is bent, the joint is said to be flexed and movement in that direction is referred to as flexion. When the bent joint is straightened, the joint is said to be extended and movement in that direction is referred to as extension. However, flexion and extension of the joint are accomplished by flexing muscles that are connected to opposing sides of the joint. The muscles themselves are incapable of pushing. With regard to the human body, flexion and extension applies to the knee, finger joints, finger metacarpophalangeal (MCP) joints, the waist and others. These same terms, flexion and extension, may be applied to the movement of restraints.

In the performance of many tasks, gloves are a person's primary interface with equipment and tools and must be as easy, efficient and comfortable to use as possible. It is also common for gloves to provide thermal protection from hot equipment and include high friction surfaces on the palm and finger fronts to increase dexterity. To provide these desired properties, gloves and other restraints can become thick, resilient and restrictive to the natural movement of the underlying member. Therefore, it is desirable that gloves and other restraints be kept as thin as possible to maintain tactility and reduce the amount of torque necessary to flex or extend the restraint.

It is desirable that the areas of a restraint covering a jointed member, such as the finger MCP joint areas of a glove, be both thin and conformal, because flexion of a joint causes the longitudinal length on the bent side of the joint to be reduced and excess material to gather in these areas. This gathering hinders the movement of the joint and can act as a standoff interfering with the function of the underlying member. For example, where the restraint is a glove on a hand, the gathered material can prevent objects from entering the palm fully, and thus making grasping difficult.

One particularly complex and demanding restraint is the space suit and gloves worn by an astronaut during extra vehicular activities (EVA). During an EVA, an astronaut's ability to perform efficient and accurate work outside the spacecraft is critical for the success of the mission. A critical factor that limits the ability of the astronaut to perform an EVA is the amount of torque that each joint of the body must apply to flex the heavy space suit. By moving a body member in the desired direction, the member pushes against the inside wall of the suit, which is essentially a fabric pressure vessel. Specially constructed joints in the suit move in response to the astronaut's movement, but require a certain amount of torque to operate. The torque required to move the joint is usually proportional to the internal pressure, with higher pressures resulting in higher joint torque.

Many different tasks may be required during a single EVA, depending upon the mission. These tasks may include the use of various hand tools, grasping of larger objects and operating difficult levers such as parking electrical connectors in place. It may be even be necessary to retrieve and position loose nuts onto a bolt. Although there are four finger MCP joints per hand, most pressure suit gloves group all four joints together and treat them as if they function as one. The four joints are grouped together because these joints are used primarily when grasping, during which all four fingers are flexed simultaneously.

The Extravehicular Mobility Unit (EMU), which is the space suit currently used on board the space shuttle, operates nominally at 4.3 pounds per square inch absolute (psia). At this low pressure, astronauts must breath pure oxygen for a period of almost two hours before executing an extra vehicular activity in order to avoid decompression sickness. To increase mission efficiency, space suits are currently being designed to operate at 8.3 psia, the lowest pressure which does not require astronauts to pre-breathe pure oxygen. In order to make a space suit operable at this higher pressure, metals or hard composite structures are required to make many parts. Consequently, some joints, particularly those of the glove, will become quite difficult to operate. The amount of torque required to actuate the glove is the difference between the astronaut's torque output and the torque applied to the tool or object. Gloves that require high actuation torque can cause premature fatigue of the hands and can limit mission capabilities, thereby decreasing the chance for mission success and posing an increase safety risk to the astronaut. For these reasons, low torque flexion of the glove is critical to mission success.

The performance of any restraint that covers a joint or hinge is determined by three major design characteristics: 1) the angular range of motion, 2) the torque required to move it through its complete range, and 3) stability throughout the joint's range of motion. To maintain a high angular range of motion, it is desirable to employ restraint joints that provide at least the full range of motion of the jointed member therein, such as that of a astronaut's finger. Reducing the torque required to move the restraint, conserves effort that could be used to accomplish other objectives. Joint stability is the tendency of a joint to maintain it at a fixed angular position without the application of a constant torque. A joint is said to be unstable at a position when it requires torque input to remain static. For example, fabric joints may become unstable at the extremes of their range of motion. Conversely, a joint is said to be stable when it requires no torque to remain at a fixed position. Various joint designs may be unstable at neutral points but stable at extremes or vice versa.

Flexion of restraints that are made of multiple fabric layers may require increased amounts of torque in order to overcome friction between the layers. Friction is also caused by the jointed member rubbing against inner walls of the restraint, ball bearings scrubbing their races, pressure in environmental seals within the bearings rubbing their sealing surfaces and fabric layers rubbing against adjacent components. In applications where the restraint forms a pressure vessel, compression of joint internal volume may occur during flexion, particularly at the range extremes. This compression requires work and energy to accomplish, and tends to oppose flexion.

EMU gloves, such as the 3000 series glove, require particularly high torques, because they incorporate multiple fabric layers and also are pressure vessels. Current EMU gloves employ flat pattern joints for the fingers and thumb and a hybrid joint with an external gimbal ring and restraint lines to allow omnidirectional wrist movement. The pressure bladder, a single piece made by dipping in mold in urethane solution, is made larger than the restraint so as to not encounter loading in the plane of the wall of any kind. The restraint layer incorporates joint features to allow motion. A third layer over glove provides thermal insulation, and has flat pattern joints for the fingers to allow motion.

Because fabric pressure vessels naturally try to achieve a circular shape in any cross-section and the cross-section through the hand at the palm creases should be flat, EMU glove designs incorporate special features to the glove which make the pressurized shape more conformal. The most effective device is a flattened palm bar and strap which crosses the palm just below the MCP joints of the fingers to compress the glove into an oval cross-section that is more conformal to the hand. The palm bar spans the palm side of the glove and extends roughly 70 around to the back of the glove on each side. The ends of the strap are typically coupled with an adjustable buckle to retain the bar in position. The palm bar typically has a diameter of about 0.156 inches and is made of 300 series stainless steel with flattened ends for comfort.

Because a relatively high torque is required to move the MCP joints of the glove, as compared with the tips of the fingers and thumb, astronauts frequently modify their grip by flexing their fingers and thumbs further than normal while keeping their MCP joints straight. This type of grip tends to over utilize the fingers and thumb because they flex further than normal. Flexion into this further range increases torque required to bend these joints which brings the onset of fatigue earlier than if the MCP joint were used more during grasping.

EMU glove limitations require that tools and EVA compatible equipment be furnished with grasping points that are large, approximately 2 inches in diameter, to reduce fatigue induced by grasping. Levers, switches and other devices are made large enough to allow actuation with an open hand and designed so as not to require finger/thumb opposition where possible. Furthermore, the maximum allowable force to actuate an EVA tool is also limited due, at least in part, to glove limitations. Hardware placed in the palm reduces tactility to an unacceptable level.

Therefore, there is a need for a method and apparatus for reducing the amount of torque required to actuate a restraint layer, such as a glove, covering a moveable member, such as a hand. There is also a need for an apparatus that is external to the restraint layer, thereby allowing the device to be much smaller and lighter because it does not have to meet life critical safety standards. Furthermore, it would be desirable if the apparatus did not noticeably interfere with movement of the joint, i.e. does not change the geometry of grasping in the palm or decrease the dexterity of the hand by requiring unnatural movements for operation. It would be further desirable if the joint were power assisted and incorporated a power transmission method that allowed use of a remote motor. It would also be desirable if these apparatus did not exceed stress limits on the fabric restraint layer or damage it by forcing movement in a way that induces premature failure of the restraint. It would also be desirable if the apparatus did not limit joint travel to unacceptably small angles, but rather would increase the range of some fabric or hybrid joints by applying the needed torque to compress volume at the extremes. Furthermore, in applications where the restraint forms a glove, the tactility and grasping geometry of the glove with relation to the grasped object should be maintained.

SUMMARY OF THE INVENTION

The present invention provides an actuator for flexing a flexion region of a restraint, comprising a power assisted drive member secured in a fixed relationship with the restraint; and a flexible member having a first end coupled to the drive member, a second end coupled to the restraint and a middle portion crossing the flexion region. The drive member may be a retracting member, such as a drive roller, and the flexible member may be a fabric panel or a cord. Alternatively, the retracting member is a cord and the drive member comprises a sheath. The drive member can be secured to the restraint by a pair of hubs. Further, the drive member may comprise a motor.

The present invention also provides a power-assisted joint, comprising a restraint having a flexion region; a power assisted drive member secured in a fixed relationship with the restraint; and a flexible member, such as a fabric panel, having a first end coupled to the drive member, a second end coupled to the restraint and a middle portion crossing the flexion region. The restraint is typically conformal about a bendable member, such as a finger. The invention may further comprise a motion sensor that is coupled to the restraint or detachably attachable to a human joint and is in electronic communication with the drive member. A controller may also be provided in electronic communication with the sensor and the drive member.

The invention further provides a power-assisted joint, comprising a resilient restraint having a curvilinear profile; and a plurality of actuators coupled to the restraint, each actuator comprising a power assisted drive member and a flexible member. The plurality of actuators may be disposed linearly along a side of the restraint, disposed in two lines along opposing sides of the restraint, or include three or more actuators disposed around the perimeter of the restraint. The restraint itself may be internally pressurized in such a manner to form a cuff or an internally pressurized arm. The joint may further comprise a controller in electronic communication with the actuators. The restraint may form a robot arm and include an end effector coupled to the distal end of the arm, wherein the controller is in electronic communication with the end effector.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 13A, 13B and 13C are mechanisms for transmitting the rotation forces from a remote motor to the drive roller;

DETAILED DESCRIPTION OF A PREFERRED EMBODIMENT

Figure 1:
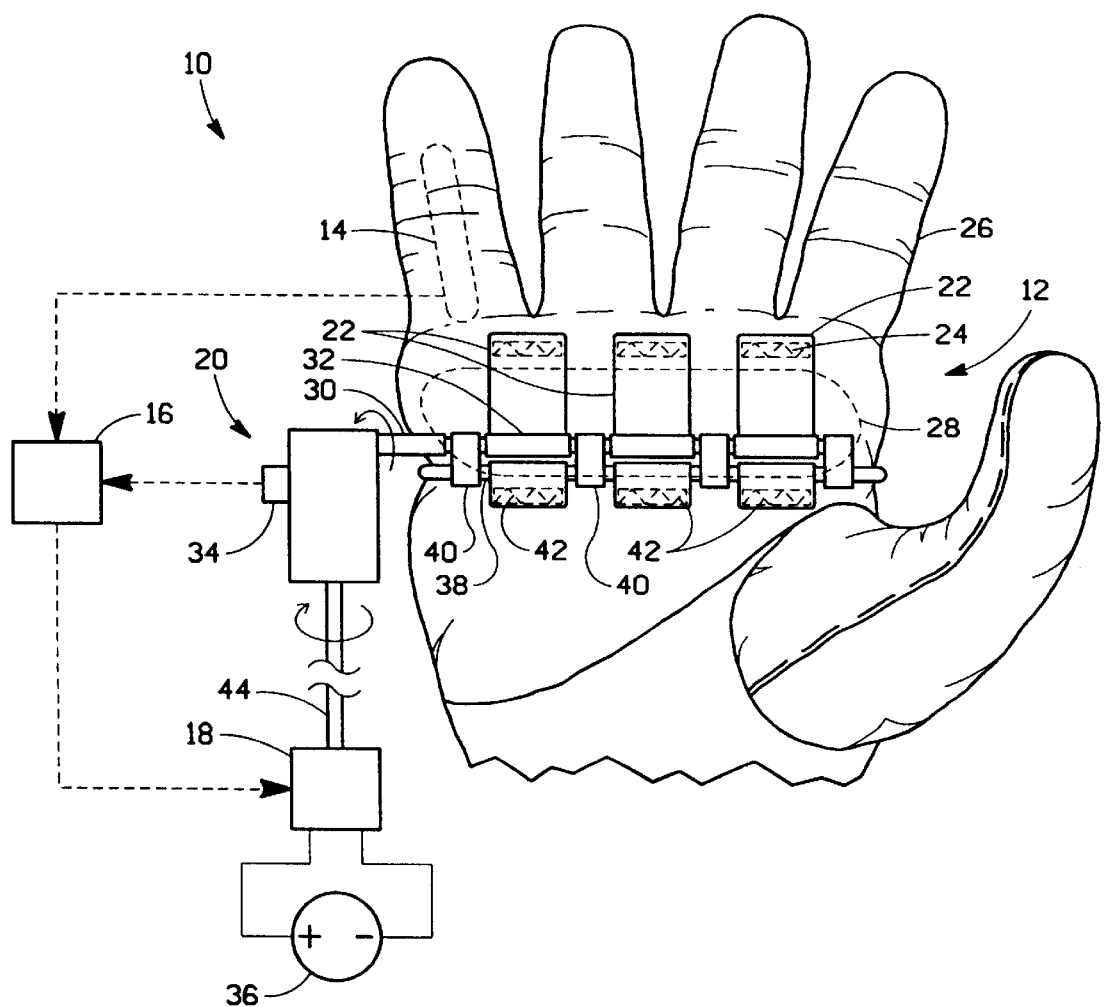
FIG. 1 is a partial schematic front view of a retracting panel actuator.

The present invention provides a power assisted actuator assembly for flexing restraints in response to movement of an underlying member or a controller. The actuator assembly generally includes a flexible member, such as a cord or fabric panel, having a first end coupled to the restraint and a second end coupled to a drive member, such as a drive roller or winch. The drive member, which may be located remotely or locally, pulls on the flexible member to flex the restraint. The actuator assemblies are useful in many applications, including space suit gloves and compliant robot arms.

In one aspect of the invention, the actuator assembly comprises part of a glove, such as the 3000 series glove used by astronauts during an EVA. In this application, control of the actuator is preferably provided by a sensor positioned to detect movement of the human joint inside the glove being actuated. When a gap exists between the human finger or joint and the internal surface of the glove, the motion of the human joint generally precedes movement of the glove restraint. However, as a glove becomes more conformal to the human joint, the motion of the restraint occurs substantially simultaneous with the motion of the human joint. In either case, movement of the human joint can be detected and used to control the powered actuator.

In another aspect of the invention, a conformal joint is provided in which only small gaps exist between the human joint and the surrounding membrane joint. For example, glove joints surrounding fingers are very conformal and move at substantially the same instance fingers flex. At these locations, sensing the motion of a nearby joint that occurs in conjunction with the controlled motion during use may be possible. In this case, users may need to learn to include such controlling motions along with motion of the controlled joint.

In another aspect of the invention, a sensor is used to track movement of the hand or other human joint that does not cause additional resistance to movement. The sensor generates a substantially linear output signal based on angular flexion of a joint and is readily adaptable to the sensor actuation method chosen for the particular joint application. The sensor provides a suitable output signal over the entire range of motion of the body part it senses without inaccuracies due to material hysteresis or design inadequacies.

In yet another aspect of the invention, a retracting panel actuator system is provided that comprises a sensor, controller, power source, motor, power transmission system and retracting panel assembly. The energy source may include replaceable batteries, preferably slim conformal battery packs curved to fit a particular contour (to minimize volume). Where desirable, the retracting panel actuator system may reside entirely on the outer surface of the restraint and make no penetration therethrough. This may be desirable in hostile environments where the integrity of the restraint cannot be compromised.

Another aspect of the invention provides actuators positioned in various configurations to provide a variety of motions. The actuators may be disposed along either side of a resilient joint, such as that formed by an inflated cuff, in order to provide both flexion and extension motions to the joint or flexion in muptiple directions. Furthermore, a plurality of actuators may be linearly disposed on either side of the resilient joint in order to provide one or more bends in the same or different directions having the same or different bending radii. The actuators may also be disposed in a stagerred configuration about the perimeter of a joint to provide omni-directional movement to the joint. The actuators may also be located inside an inflatable cuff between its inner and outer walls.

FIG. 1 is a partial schematic front view of a retracting panel actuator system 10 of the present invention, as applied to the MCP joint of a glove. The retracting panel actuator system 10 includes a retracting panel assembly 12, motion sensor 14, controller 16, motor 18, and transmission system 20. The actuator system 10 may be operated in various modes, such as real time or preprogrammed, and in response to various conditions, such as internal or external stimuli. However, the system 10 is preferably operated so that the restraint provides a real time emulation of the movement of an internal member, such as a finger, which provides stimuli to the sensor. The retracting panel assembly 12 uses flexible members or panels 22 having a first end 24 sewn or otherwise attached to the restraint 26 adjacent a first edge of a flexion region 28, i.e. at the base of the glove fingers. One or more panels 22 may be used along the first edge of the flexion region 28 in order to provide power-assisted flexion over the entire width of the region. The individual panels 22 are coupled to a drive roller 30 which also spans at least a portion of the flexion region 28. Each panel has a second end 32 that is attached to the drive roller 30 so that the panels can be wound around the outer surface of the drive roller 30. When an actuating torque is applied to the drive roller 30, the flexible panel(s) 22 are wound up and retracted, thereby flexing the restraint 26 in the flexion region 28.

The retracting panel assembly 12 also includes a stationary bar 38 fastened to the restraint 26 adjacent an opposed edge of the flexion region 28. While any fastener may be used to secure the stationary bar 38, a preferred fastener is a flexible panel 42, made of similar material to the retracting panels 22, extending around the backside of the glove. The stationary bar 38 and drive roller 30 are linked together by a hubs 40. Where the restraint 26 is a space suit glove, the stationary bar is preferably a palm bar which gives the internally pressurized glove a cross-section that is oval or conformal to the palm of a hand. Each hub 40 acts as a bearing to allow the drive roller 30 to turn therein and is preferably positioned between each of the retracting panels 22.

The retracting panel assembly 12 causes flexion of the restraint in response to motion detected by the sensor 14, which preferably senses the angular bend of an MCP finger joint. The senor 14 may be positioned on the exterior surface of the restraint 26 or, more preferably, directly on the internal member, here a hand (not shown). Furthermore, the sensor may be positioned on or in relation to the immediate joint being actuated or another joint, such as the joint of an adjacent finger. The sensor sends an electronic signal to a controller 16 that is designed or programmed to respond to the sensor signal and provide control signals to the system 10, particularly the motor 18. When the sensor 14 sends a signal indicating that the internal member of joint has been flexed, the controller 16 sends a signal to the motor 18 that provides sufficient torque to the drive roller 30 to retract and flex the restraint 26 to a substantially equal degree. In this manner, the flexion region 28 of the restraint can be made to emulate the movement of the internal member and reduce the amount of torque required for the internal member to flex the restraint. Where the restraint is a glove and the internal member is a hand, the actuator system will reduce the amount of effort an operator must apply to grasp objects and ultimately will extend the amount of work that can be accomplished before experiencing fatigue.

It is preferred that the system 10 include a second sensor 34 to provide first order error feedback to the controller 16 about the actual flexing of the restraint 26 in the flexion region 28 or, more preferably, the actual number of turns that the drive roller 30 has made. A signal that is proportional to the number of drive roller turns can be provided by a rotary potentiometer 34 mounted to the transmission system or other member that is mechanically linked to the drive roller 30. Preferably, the feedback sensor 34, or potentiometer, will be positioned close to the final actuating components, i.e. the drive roller, in order to reduce mechanism backlash.

Power sources that may be used with the actuator assembly include AC or DC electricity, pneumatics, hydraulics, phase-change materials stimulated by electric current, piezo-electrics and the like. However, DC electric power is preferred for most applications. For wireless applications, the power source 36 may be a battery mounted on the outer surface of the restraint. For use with space suit gloves, the power source is preferably a battery 36 coupled to the space suit above the elbow on the upper arm rather than on the lower arm, to prevent expanding the envelope close to the astronauts hand. A conformal battery may be provided that is specially designed to accomplish a defined amount of work.

For use with space suit gloves, the power source is preferably an electric storage battery, due to its high safety, light weight, low cost and rechargeability. If the system 10 used a 2.5 amp motor operating 0.5 seconds for each joint movement and allowing about 10 joint movements per minute over the span of a 6 hour extra vehicular activity, then the total time of actuation is estimated to be about 1,800 seconds per EVA. For a motor having a terminal resistance of 9.6 Ohms, the voltage required to input 2.5 amps is about 24 volts. A rechargeable nickel metal hydride battery rated at 1.2 volts with 2.2 amp hour capacity has dimensions of about 0.67 inches by 1.97 inches and has a weight of about 1.431 oz. To achieve 24 volts, 20 such batteries would be required, having a total weight of about 26 oz.

In applications where the power source 36 and motor 18 are located remotely from the joint, a transmission system 20 must span therebetween. The transmission system is preferably comprised of components that are flexible to allow deformation of the restraint and provide a means of changing the direction of the motive force as needed, such as at any joints disposed between the motor 18 and the retracting panel assembly 12. In applications where a motor 18 is positioned remotely from the drive roller 30, a flexible transmission system 20, comprising a flexible shaft 44, may be used to transmit rotational forces to the drive roller 30. In alternate actuator systems, such as that shown in FIG. 12, the flexible transmission system may transmit a linear force through use of a cord and sheath.

A traditional flexible shaft 44, consisting of a flexible casing and flexible wound wire core, may be used for transmitting a rotational force. The overall diameter of the shaft 44 is effected by the amount of torque that must be transmitted, the maximum required number of shaft rotations per minute and the minimum bend radius of the shaft. However, high amounts of torque transmitted through the flexible shaft can cause a phenomenon called "helixing" in which excess torque imparted on the shaft causes it to twist into a helix. Therefore, the transmission system 20 preferably includes a gear reduction member located between the flexible shaft 44 and the drive roller 30.

Figure 2:
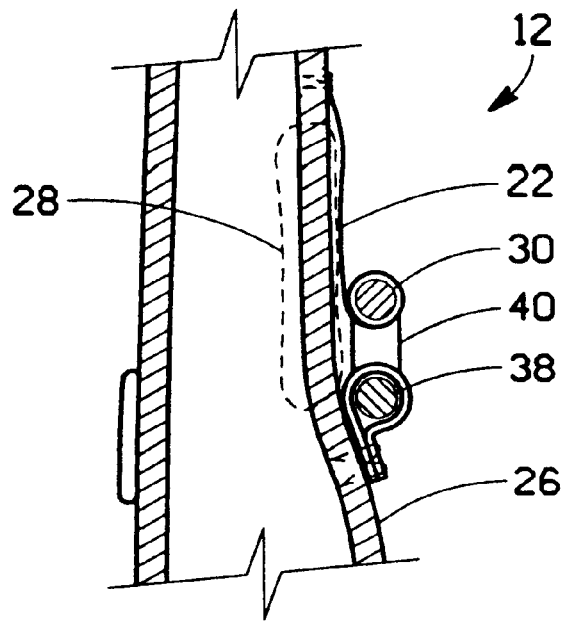
FIG. 2 is a cross-sectional side view of the retracting panels of FIG. 1.

FIG. 2 is a cross-sectional side view of the retracting panel assembly 12 of FIG. 1. The hubs 40 are shown having the stationary bar 38 and drive roller 30 disposed therethrough. It is preferred that the retracting panel 22 connect to the drive roller 30 adjacent the restraint, so that the panel 22 can lay flat against the surface of the restraint 26. It is also preferred that the panel 22 pass under the drive roller so that the panel lies against the restraint surface 26.

When the retracting panel assembly 12 of the present invention is used with a 3000 series space suit glove, full contraction of the MCP joint flexion region 28 requires a distance of no more than about 1.25 inches. The drive roller for this application has a preferred diameter of about 0.125 inches, because it can have several layers of the panel 22 material wrapped around it without the collective diameter becoming greater than that of the palm bar, which has a diameter of about 0.156 inches. When the 3000 series glove is placed under 4.3 psig pressure, it requires a torque of between about 2.5 and about 5.0 inch pounds of torque to actuate the glove. While an astronauts movements are generally slower than one performing similar tasks without the encumbrance of a suit, a maximum target MCP joint operation rate was estimated to be about 0.5 seconds for flexion and about 0.5 seconds for extension. Given a roller diameter of about 0.125 inches, the drive roller 30 must be rotated at a rate of about 382 revolutions per minute.

Where the restraint is a glove, the stationary bar 38, hubs 40 and drive roller 30 are preferably as thin as possible. Where the restraint is a space suit glove, the hubs 40 and drive roller 30 are preferably thinner than or equal to the diameter of the palm bar 38, which is a typical part of the glove, so that no additional thickness is added to the palm. In an alternative configuration, the drive roller or winch 30 may have segments with unequal diameters to provide actuation of different rates at different locations along the same flexion region. Large diameter roller segments will actuate or retract a greater length of the flexible member per revolution than a small diameter roller. Most of the MCP joint distance is spanned by thin, flexible panels 22, preferably made of a fabric material, that do not degrade tactility in this area. The drive roller 30 and hub 40 pieces are preferably positioned closed to the palm bar 38.

Figure 3:
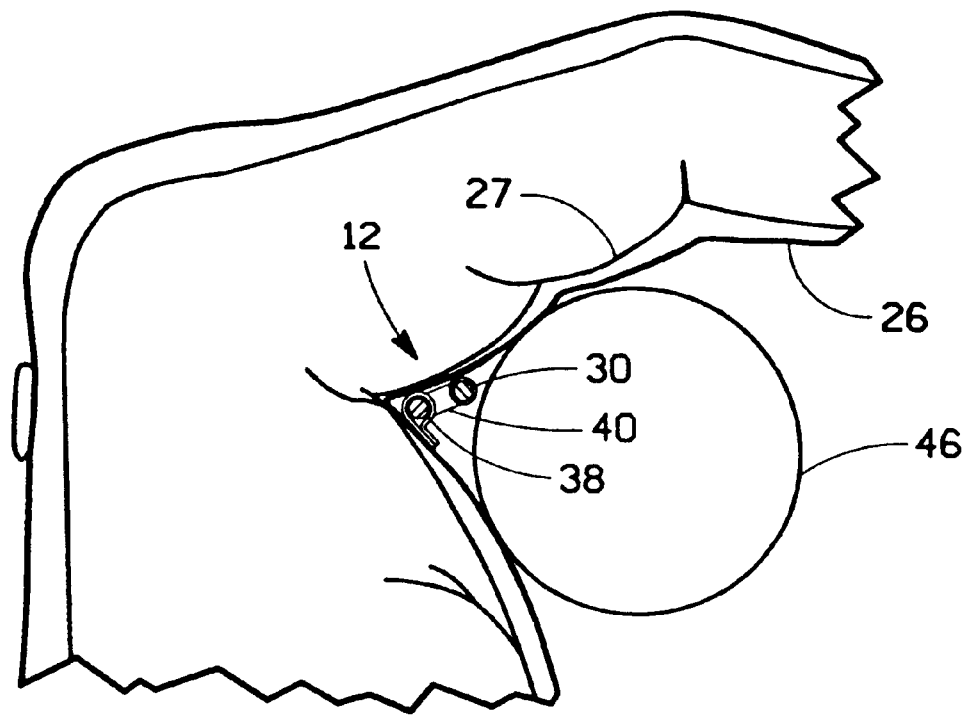
FIG. 3 is a cross-sectional side view of the retracting panels of FIG. 1 with the restraint flexed.

FIG. 3 is a cross-sectional side view of the retracting panel assembly 12 of FIGS. 1 and 2 in a flexed position. When using the retracting panel assembly 12 on gloves, it is important to retain the tactility and grasping characteristics of the open hand. Therefore, the assembly preferably changes the shape of the restraint 26 similar to that of the bare hand 27 in flexion. This is accomplished by reducing the longitudinal length of the palm side of the restraint as the joint is flexed. For example, an MCP joint may require a reduction of up to one and a quarter inches (1.25 inches) depending on glove size and the desired angular range of actuation. Consequently, when the restraint 26 is fully flexed, the hard drive roller 30, palm bar 38 and hub pieces 40 are recessed into the hand away from the surfaces of the restraint 26 that actually touch the grasped object 46. Upon retraction, the panel assembly 12 relieves pressure loading in the axial direction from the restraint and draws the flexion region 28 of the restraint 26 together into a fold. This retraction compresses the internal volume of the glove to make the restraint on the palm side shorter than on the back side and thereby closes the palm of the glove. It is also beneficial if the retracting panel assembly 12 does not interfere with the use of the restraint even when assembly is inoperable. Therefore, it is preferred that the retracting panel assembly should fail in a condition which does not hinder the use of the underlying jointed member and also that the retracting panel assembly be uncoupleable from the restraint 26.

Figure 4:
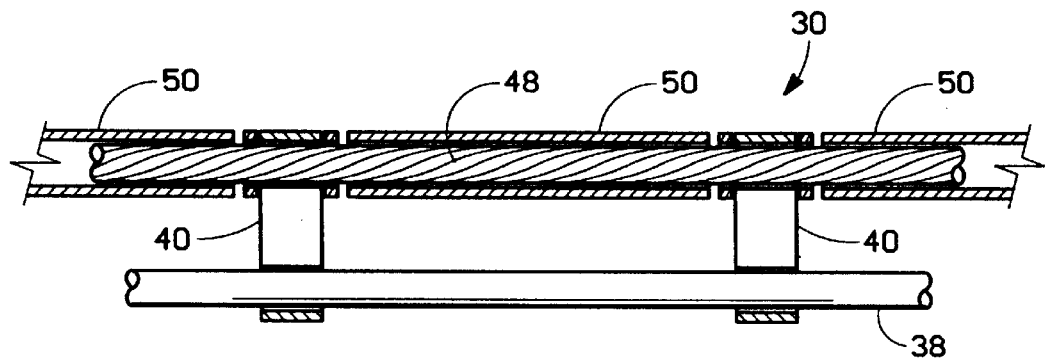
FIG. 4 is a cross-sectional view of a drive roller mechanism using a flexible cable.

FIG. 4 is a cross-sectional view of a drive roller mechanism 30 comprising a flexible cable 48 and tubes segments 50 attached thereto. The drive hubs 40 must be strong enough to withstand the tensile force in the axial direction that is required to retract the restraint (not shown). For use with the 3000 series space glove, this tensile force is about 4 pounds for each of the four drive hubs 40 (See FIG. 1). Because modifying the palm bar 38 could jeopardize safety, the hubs 40 are preferably wrapped around the palm bar diameter without modification. However, the added material thickness of the hubs 40 should be as small as possible to minimize hardware thicknesses that will interfere with the function of the restraint or underlying member. For example, hardware in the palm of a glove should not be so thick as to push grasped objects away or cause the user to feel a bump in the palm at each location.

In addition to acting as a rotating bearing for the drive roller, the hub 40 provides means for maintaining separation of the drive roller 30 from the palm bar 38, therefore preventing binding and abrasion of the retracting panel during operation. However, the distance between the drive roller 30 and stationary bar 38 should be minimized to avoid reducing tactility and interference with other objects as discussed above.

Additionally, the use of a flexible cable 48 in the drive roller 30 allows the longitudinal axis of one segment to be at an angle with the axis of an adjacent segment. When combined with the ability of the hubs 40 to pivot about the palm bar, the assembly 30 can shift and conform to the palm surface shape any time during flexion and extension.

Figure 5A:
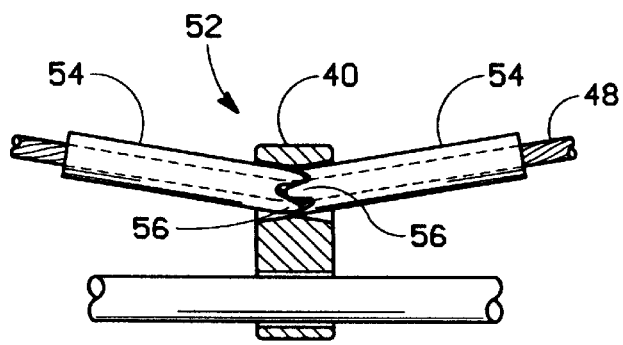
FIGS. 5A, 5B and 5C are cross-sectional views of a hub having a mechanical link between adjacent roller segments, where the mechanical links are based on an intermeshed finger drive with flexible cable cord, a connecting ring drive and a key slot drive with a flexible cable cord.
Figure 5B:
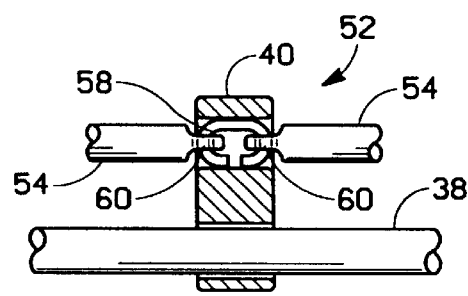
Figure 5C:
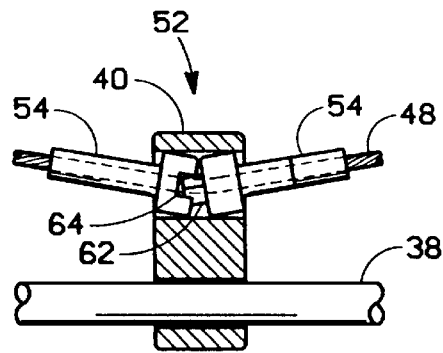

FIGS. 5A, 5B and 5C are cross-sectional views of hubs 40 having mechanical links 52 between adjacent roller segments 54. FIG. 5A shows a mechanical link 52 based on intermeshed fingers 56 with a flexible cable 48 extending therethrough. FIG. 5B shows a mechanical link 52 based on a connecting ring 58 which couples with loops 60 formed on the ends of the roller segments 54. FIG. 5C shows a mechanical link 52 based on a key 62 and slot 64 with flexible cable 48 extending therethrough. Other mechanism links may be used in accordance with the present invention, including hexagonal drive elements and the like.

Each of the roller segments 54 preferably have a length that is about the same as the width of the finger that the segment is next to. The roller segments are allowed to lay against the outside of the restraint fabric layer on the finger side of the palm bar. Segments transmit torque to one another through flexible mechanical links at the ends near the hubs, either directly from one link to another or using rotating tubes and hubs as intermediate links. Consequently, all panels coupled to a common drive roller are retracted simultaneously by a torque drive system on the little finger side of the hand connected to the last roller segment of the chain.

Figure 6:
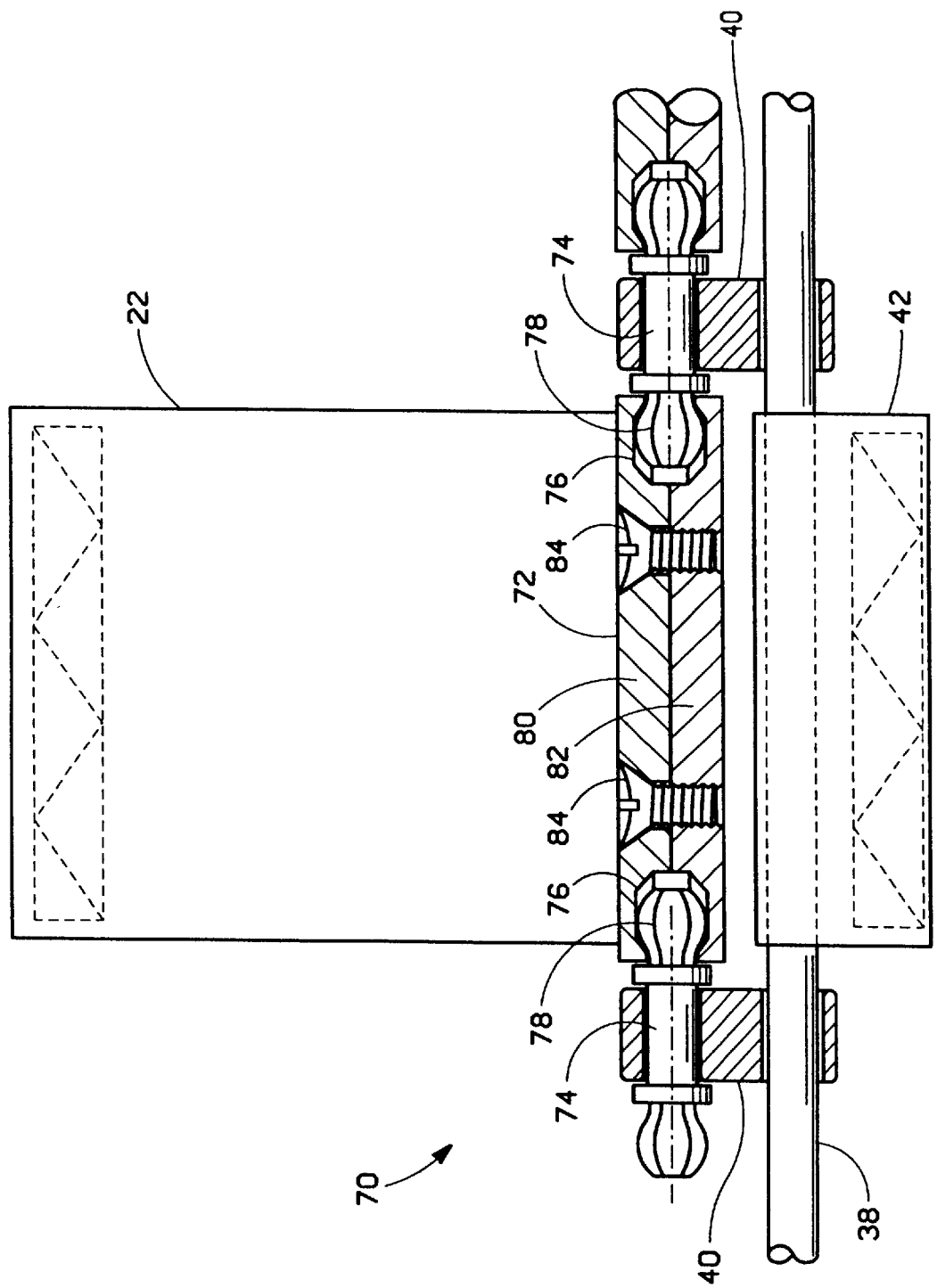
FIG. 6 is a partial cross-sectional view of a single retracting panel and drive roller segment.

FIG. 6 is a partial cross-sectional view of a single retracting panel assembly 70 having a drive roller segment 72 and mechanical links 74 rotatingly engaged with the hubs 40. The drive roller segment 72 has hexagonal female recesses 76 at both ends for securing the hexagonal male extensions 78 of the adjacent mechanical links 74 and preventing disassembly. The drive roller segment 72 is preferably formed of two mating halves 80, 82 that are held together by fasteners 84. The hexagonal couplings can be made to transmit rotational torque from one drive hub to the next with little or no backlash. The retracting panel 22 can be attached to the drive roller 72 by any means, but preferably attach to the roller in a low profile manner. It is most preferred to secure the second end of the retracting panel 22 to the drive roller segment 72 by clamping the panel 22 between the two mating halves 80, 82. Unlike a drive roller made of a flexible metal cable, should any of the drive roller segments or mechanical links break they will not puncture or tear the restraint. Therefore, a drive roller made from roller segments and mechanical links is preferred for use with critical restraints, such as space gloves.

In applications where the integrity of the retraint is not critical, the drive roller may consist of a single flexible cable extending across a portion of the palm and having sufficient flexibility to conform with the palm. Using a single flexible cable eliminates the need for segment to segment drive connections. Flexible cable drive rollers will preferably have thin wall tubes secured over the cable to form roller segments with sufficient stiffness to allow the retracting panels to wind up smoothly.

The retracting panels 22 must attach to both the roller and the glove restraint and have sufficient strength to transmit five to six pounds tensile force and resist wear against two free sides. In addition, the panels should be flexible, thin and resist failure and tear. To prevent damage to the restraint, it is preferred that the panel be attached to the restraint by stitching. The panels may be comprised of plastic film, rip stop fabric or rip stop fabric with a flexible coating, such as neoprene, urethanes and the like. A suitable plastic film may include a polyester film (available under the trade name MYLAR from the DuPont Corporation) or a polyimide film (available under the trade name KAPTON from the DuPont Corporation). Certain polyester rip stop fabric, commonly used for the finger joints of space suits, may also be used. These fabrics are referred to as "rip stop" because they possess the ability to isolate and resist propagation of any tear occurring in the fabric.

For various fabrics, a simple fold-over seam will be needed along the two sides to maintain the integrity of the panel during use. To prevent the double thickness areas of the retracting panel from stacking onto one another when wound on the roller and double its diameter, the shape of the panel could be tapered. More preferably, a rip stop fabric as described above, but coated on one side with a neoprene rubber compound may be used. This fabric has two important advantages: 1) the coating prevents raveling edges, thereby eliminating the need for folded and sewn edges; and 2) the coating provides a better surface for bonding the panels to the rollers. While the coating does add approximately 0.003 inches thickness to the fabric, this increase is less than an extra layer of fabric at a seam.

Figure 7:
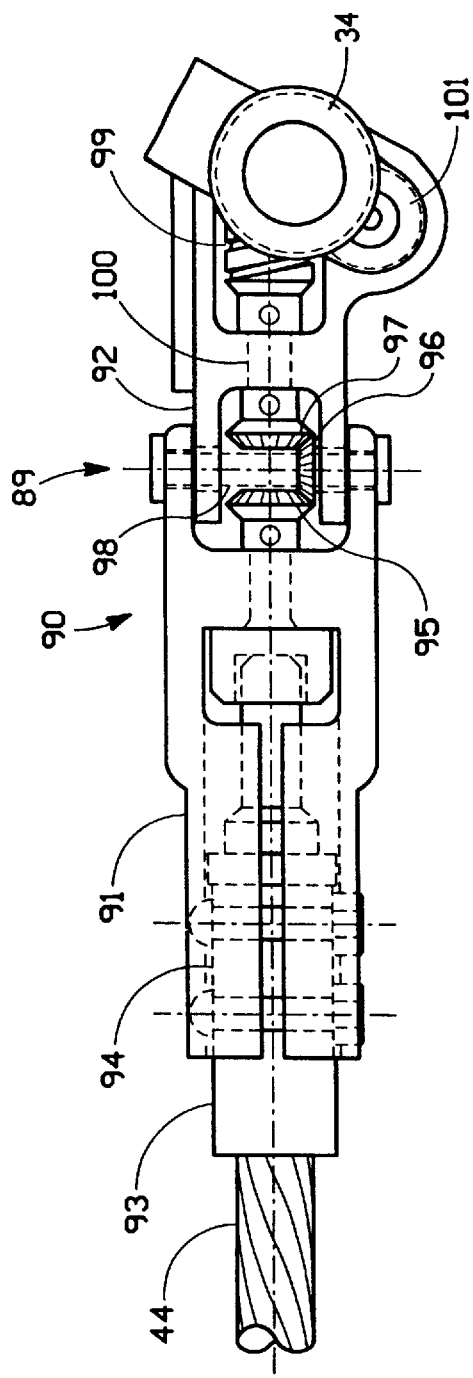
FIG. 7 is right angle drive unit.
Figure 8:
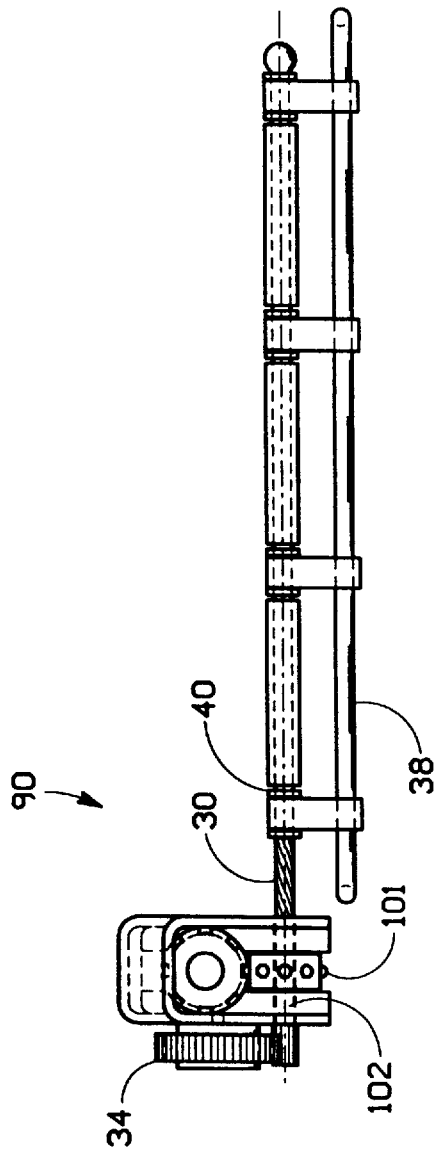
FIG. 8 is a side view of the right angle drive unit of FIG. 7.

FIGS. 7 and 8 are two side views of a right angle torque redirect subsystem 90 which is coupled to the drive roller 30. The right angle drive unit 90 may be used to provide both a change in rotational direction and gear reduction. The unit is divided into two sections with each section possessing a joint that provides one degree of freedom to redirect the drive path. A first section 91, interfaces and secures the flexible shaft 44. Preferably, a male hex member 93 at the end of the shaft 44 plugs into a female hex shaft 94 in the first section 91 and is crimped, bolted or otherwise secured into place. The opposite end of the female hex shaft 94 includes a first mating miter beveled gear 95. This first miter beveled gear 95 meshes with an idler gear 96 which in turn meshes with an output gear 97. The idler gear 96 is preferably mounted on a shaft 98 that provides an integral part of a pin joint 89 about which the two major housings rotate 91, 92. This pin joint 89 allows the unit to hinge during wrist abduction.

The output beveled gear 97 is connected to a quadruple thread worm 99 via a shaft 100. This worm 99 drives a worm gear 101 about a shaft 102, perpendicular to shaft 100, that features a female hex-shaped recess at its center. The mating component of the drive roller 30 has a male ball end hex feature that engages this recess. The resulting right angle drive 90 can pivot 25 degrees from the centerline of the shaft in any direction. The drive unit is preferably anchored to a glove by pivotally securing the shaft 102 within a bracket fixed to the glove palm bar 38. The resultant pin joint allows rotation of the drive unit 90 about the glove. Alternative torque redirect subsystems 90 include flexible shafts 44 in fixed or flexible housings (See FIG. 13A), intermediate shafts with several gears (See FIG. 13B), and a rigid hexagonal drive system (See FIG. 13C).

Figure 9:
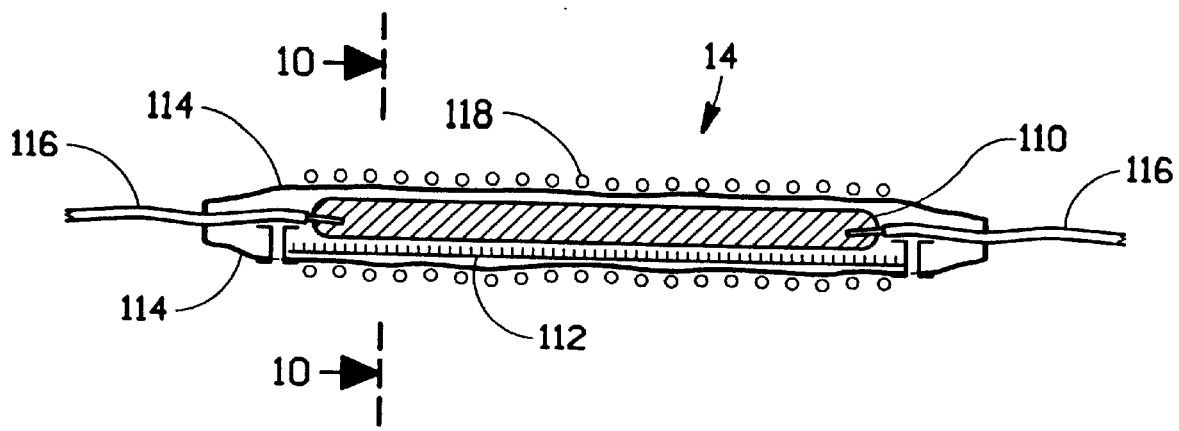
FIG. 9 is a joint movement sensor based on a conductive elastomer.
Figure 10:
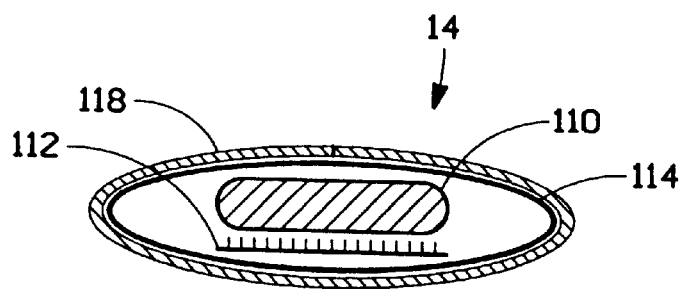
FIG. 10 is a cross-sectional view of the sensor in FIG. 9.

FIGS. 9 and 10 are cross-sectional side and end views of a joint movement sensor 14 based on a conductive elastomer material 110. The preferred sensors for use with the present invention should be capable of sensing over the full range that the glove can be actuated. For example, because the human MCP joint can flex greater than 90, the sensor should also provide a useful signal over the same range of degrees. If the glove or other restraint surrounding the underlying jointed member does not allow full actuation, then the sensor need only be capable of sensing the allowable range.

The sensor 14 may be located in many positions, including inside or outside the restraint, to provide a signal indicating movement of the underlying jointed member, such as a human finger. However, the sensor is preferably located on the backside of the joint, where the minimum bending radius is greater and the sensor will not hinder grasping or degrade tactility. When the sensor is intended to detect movement of the MCP joint, the sensor is preferably located over the back of the first knuckle of the third finger outside the restraint. For use in any location and especially inside the glove, the sensor should be as thin and flexible as possible.

The sensor 14 and sensing techniques preferred for use with the present invention include a stress sensitive conducting elastomeric material formed into a laminated film resistive strip 110 that is sensitive to bending, a rotary potentiometer 120 (See FIG. 11), a linear potentiometer incorporated in a similar mechanism, and a linear push/pull cable assembly. It is preferred that the stress sensitive sensor 14 provide a linear change of resistance with respect to stress over a reasonable region of strain. The sensor must also be flexible and have the ability to conform to the complex shape of a joint, such as the surface of a human finger, space suit glove or the like. One sensor suitable for use with the present invention is a stress sensitive resistive strip that is not succeptible to compressive loading.

The conductive elastomer strip 110 is typically formed on a urethane sheet or stainless steel foil substrate 112 and enclosed by a urethane film outer covering 114. The substrate 112 and covering 114 can be adhered to the conductive elastomer 110 using a urethane base adhesive. Polyester threads are preferred for securing the sensor to a space suit glove. If the particular elastomer strip 110 being used is sensitive to compressive forces, then the sensor 14 should be protected from bumping against another object to avoid activating the sensor 14, generating an electronic signal through wires 116 and causing inadvertent actuation of the retracting panel assembly. A flexible spring 118 may surround the elastomer to resist compression.

Preferably, the sensor is a resistive strip sensor that is not sensitive to compression (such as International Microelectronics Research Corporation, Tucson, Ariz., Model No. PS-EXP-BS-500/5/3689-F). Resistive strip sensors include a center resistive element that is protected by layers of thick film polymers on either side. The plastic film construction gives the sensor much flexibility, allowing the strip to be bent into a 0.15 inch radius without damage or negligible torque. However, a preferred sensor will not produce a dead band or provide non-linear resistance which can prevent the control system from accurately tracking angular position.

Figure 11:
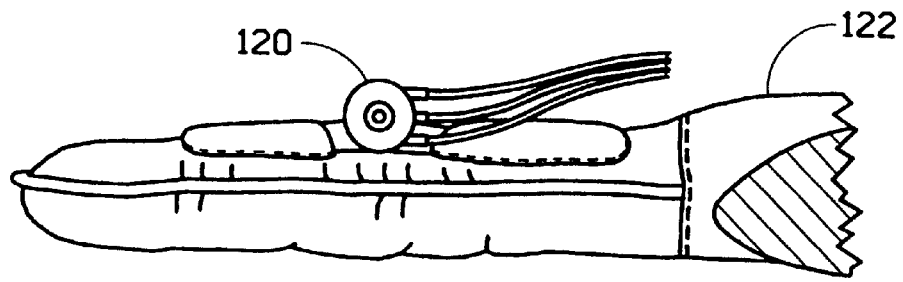
FIG. 11 is a rotary potentiometer mounted to the back side of a metacarpophalangeal joint of a glove.

FIG. 11 is a rotary potentiometer 120 mounted to the back side of a metacarpophalangeal joint of a glove 122 to provide feedback indicating the actual angular bend of the glove restraint. The control system preferably includes a feedback device located as close to the actual motion being controlled as possible to reduce inaccuracies caused by loose fitting back lash and component deformation within the actuation mechanism. The preferred location for the feedback device will vary according to the device design. In accordance with the invention, the feedback device may include any type of angle sensing device, but preferably is a rotary potentiometer.

Figure 12:
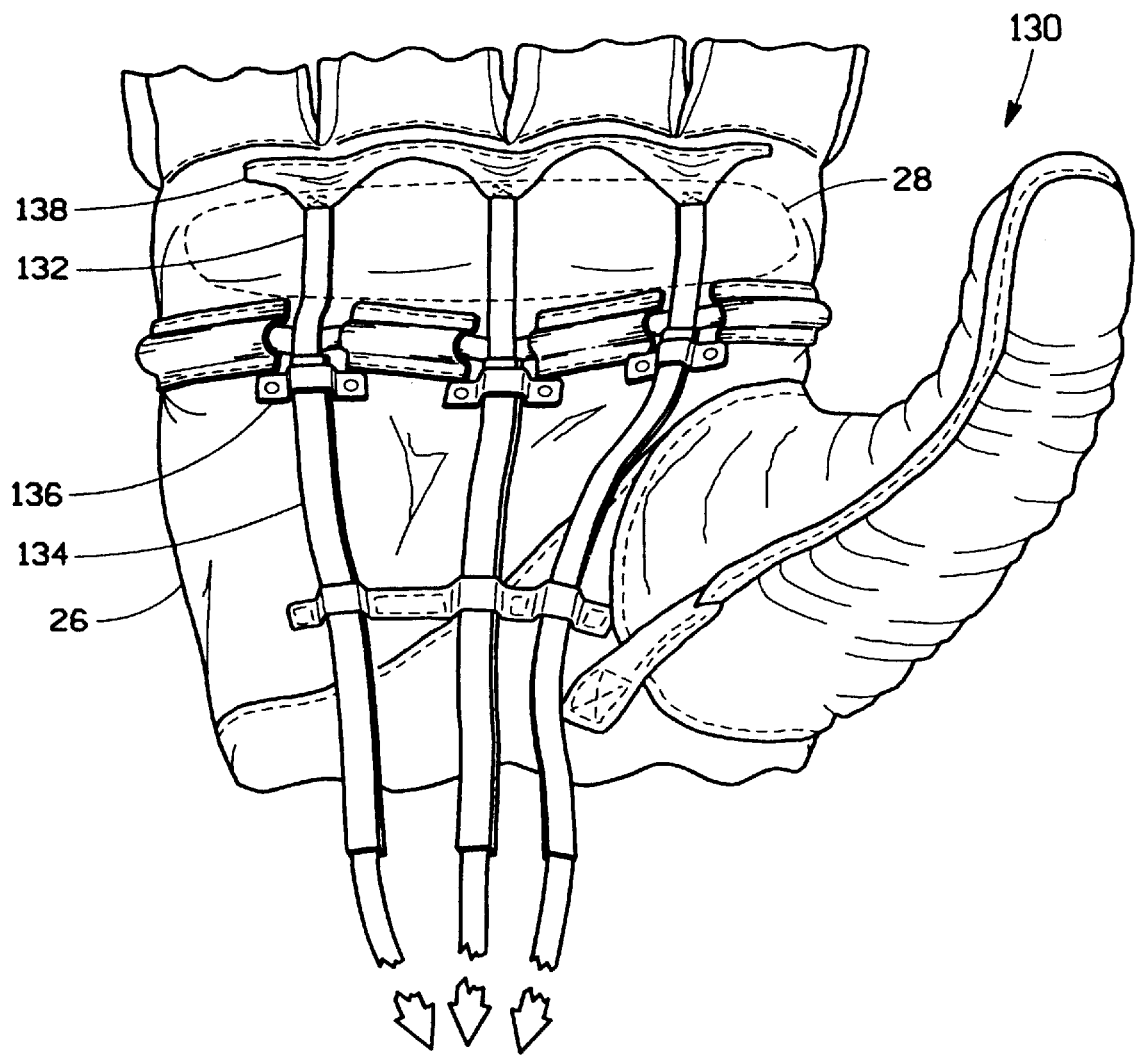
FIG. 12 is an alternative retracting panel actuator using a cord sheath assembly.

FIG. 12 is an alternative power assisted, retracting panel assembly 130 using a flexible cord 132 and sheath 134. The cord and semi-rigid sheath type housing allows for flexion of the flexion region 28 by drawing the cord 132 into the sheath 134. The sheath housings 134 would run from a motor (not shown) on the arm across the palm side of the wrist and then span the palm itself to reach the MCP area. The housing ends 136 would attach to the wrist side of the joint while the cords or tapes 132 would span the flexion region 28 and anchor to the basis of the fingers. While this assembly 130 would lend itself to individual actuation of finger joints if deemed desirable, it would also require several bulky and somewhat inflexible cable housings in the palm. The cords are preferably attached to the restraint layer 26 via load distributing panels 138. The high actuation forces of nearly 6 pounds per chord 132 are likely to cause shifting of the yarns and distortion of the weave of the restraint fabric 26 if anchored over an area too small to distribute the load. Furthermore, this assembly requires a winch type mechanism or a linear actuator to pull on the cords at the motor end.

Figure 13A:
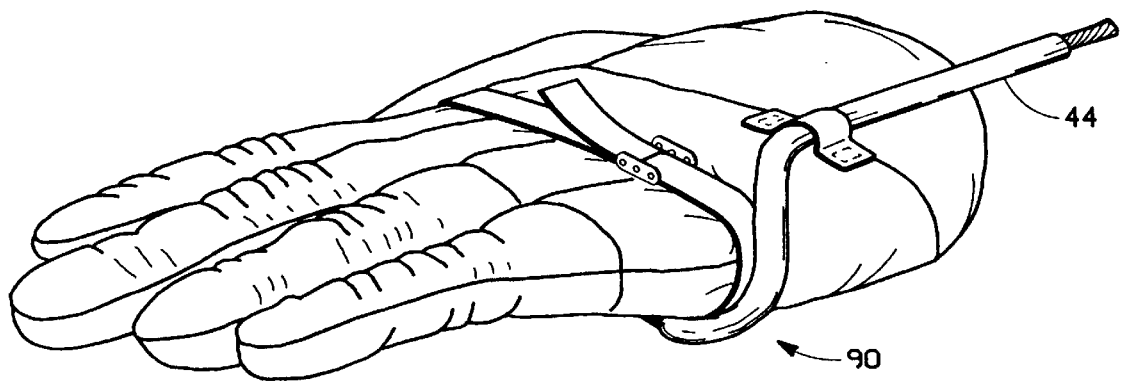
Figure 13B:
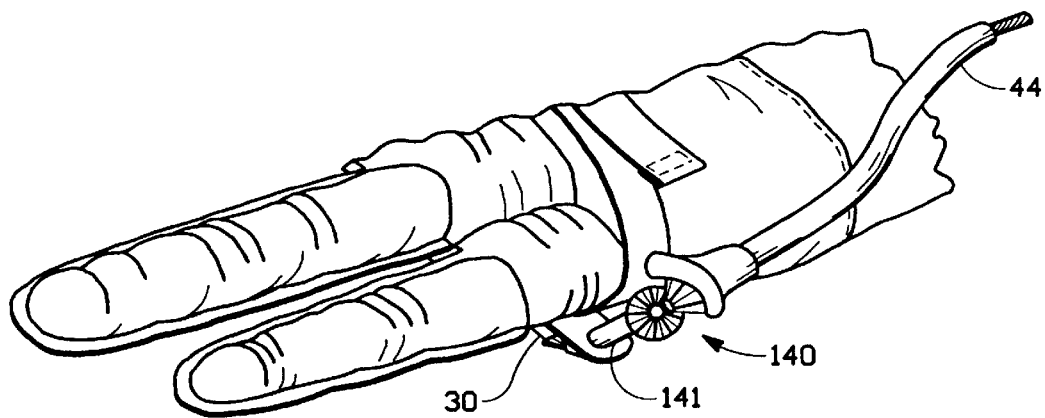

FIGS. 13A, 13B and 13C are alternative mechanisms for transmitting the rotation forces from a remote motor to the drive roller. FIG. 13A is a curved section of the simple flexible cable 44 (shown in FIG. 1). FIG. 13B provides two sets of 90 degree beveled gears 140 that transmit rotational forces from the flexible cable 44 to the drive roller 30. The rigid, intermediate shaft 141 with beveled gears spans the distance between the flexible shaft 44 and the drive roller 30 at the little finger end of the palm. The intermediate shaft 141 is pivotally secured in plane bearings fixed to an extended palm bar so that the shaft can transmit torque directly to the drive roller. The beveled gears 140 transmit rotational forces with no change in torque. Suitable rigid barriers should be used to isolate the gears from the restraint fabric.

FIG. 13C provides an alternative mechanism to the standard flexible shaft 44 for transmitting rotational forces. The mechanism 150 is a rigid hexagonal drive system that employs alternating rigid male elements 152 possessing hex-shaped extensions at either end and rigid female elements 154 possessing hex-shaped recesses at either end. The outer diameter of these female elements 154 would serve as the inner race of either a plain or roller bearing 156. The bearing journal or outer race 158 would be stationary component of the mechanism 150. It is believed that the drive assembly would operate in short increments and be smaller in diameter than a flexible shaft allowing similar torque capacity. Furthermore, anchoring each component of the outer guide 158 at small intervals on the outside of the restraint or pressure vessel surface would eliminate helixing effects.

EXAMPLE

A prototype unit was prepared employing a retracting panel assembly, an electric motor, a flexible shaft, and a right angle drive unit. The drive roller was fabricated of a single flexible cable with tubes as described earlier and the retracting panels were made from neoprene coated rip stop polyester fabric. A film resistive strip sensor was used to sense the angular position of the first interphalangeal joint of the third finger for input into the control system. A rotary potentiometer was incorporated into the final output of the right angle drive unit to sense the mechanism angular position for feedback to the control system. Analog sensor input signals were conditioned and transmitted into a feedback position control system which used the difference between the desired and actual position signals to drive the electric motor via a commercially available motor driver unit. The electric motor was positioned on the outer side of a space suit lower arm midway between the wrist and elbow joint. The motor shaft connected to the female end of a commercially available flexible shaft assembly using a specially fabricated metal bracket The flexible shaft featured one quarter inch nominal hexagonal drive features at each end (one male and one female) and a spirally wound flat strip steel flexible housing. The motor and mounting bracket were held in place using hook and loop fastener strips wrapped around the arm. A clamp was used to connect the output end of the flexible shaft to the right angle drive unit. Thrust washers were installed between the gears and the aluminum housing surfaces of the drive unit to prevent binding of the components. Teflon washers were used behind the beveled gears and stainless washers were used on either side of the wound gear.

A quad thread worm and worm gear combination provided the desired five to one reduction and a change in direction of the torque output. The worm gear provided the output from the drive unit. A female recess in the center of the worm gear shaft provided a hexagonal inner surface inside approximately half of its length for receiving the drive roller and a second inner surface which received a pinion gear. The pinion gear drives the feedback potentiometer via a mating ring gear pressed around the outer diameter of potentiometer. The female hexagonal output transmits bi-directional torques to the flexible actuation cable of a drive roller having a hexagonal male ball end inserted therein.

The right angle drive and retracting panel assembly produced a very flexible and conformal design. The low actuating forces required by this apparatus allowed very small component sizes. The flat panels drew the MCP joint area fabric evenly across the whole span of the hand. The flat area in the palm in the MCP joint area was divided into three panel widths and four drive hub widths.

The sensor assembly was made by applying a thin layer of insulating tape around the sensor and sensor terminals. The assembly was then positioned within a spring and covered with a heat shrink adhesive back plastic film. The finished unit was free to bend with little torque required. The bend sensor had high resistance (approximately 50 K ohms) when straight, and low (approximately 1 k ohms) when bent past 90. To generate a signal input to the control system, a voltage bridge was made by pairing the sensor in series with an adjustable resistor. A +15 volt input to the free lead of the sensor and common connection to the free lead of the resistor created a scalable voltage that was low (approximately 2–3 volts) when the sensor was straight, and increased to +12 volts when fully bent.

In the future, it may be possible to use fiber optic sensors and corresponding sensing electronics which offer advantages for this application because the fiber is very small in diameter allowing integration in areas of the glove with no noticeable effects at all. It may also be possible to use myoelectric sensing, a method of sensing electrical stimulus with muscles, to detect the movement of an underlying member.

The present invention may also be used without a sensor at all in applications where the actuators are to impart independent motion. These application include, but are not limited to, physical therapy of muscles and joints, robotics and the like. The actuator assemblies can be operated manually or, more preferably, by computer control which allows for multiple actuators to be coordinated simultaneously to provide useful and perhaps complex movements. The multiplicity of actuators may be disposed linearly along one side, about the perimeter of a member, staggered, or any other configuration that would facilitate a desired movement.

Figure 14:
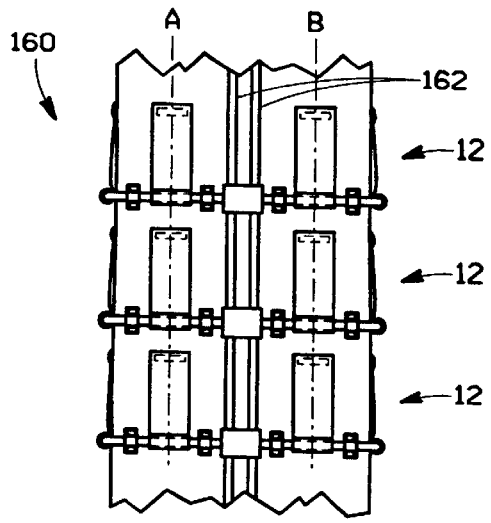
FIG. 14 is an array of actuators disposed in two lines on either side of a cylindrical restraint to provide a bi-directional joint.
Figure 15:
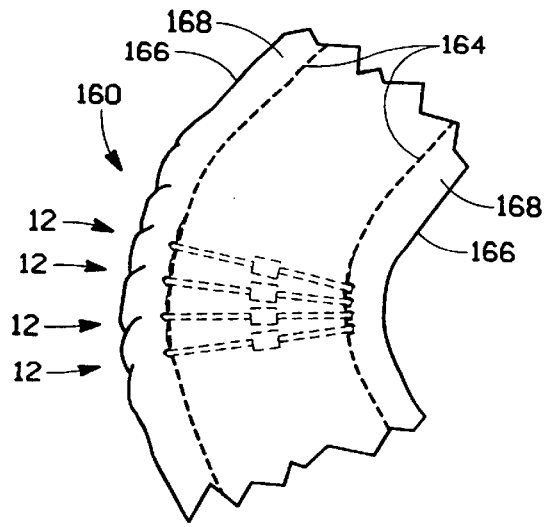
FIG. 15 is a linear array of actuators disposed along one side of a cylindrical restraint.

FIG. 14 is an array of actuators 12 disposed in at least two lines A, B on either side of a cylindrical restraint to provide a bi-directional joint 160. This joint also provides a plurality of flexible tensioning elements 162 extending between the retracting panels of adjacent rows. The tensioning elements will tend to return the restraint to its original configuration after being actuated. FIG. 15 is a linear array of actuators, similar to FIG. 14, disposed along two sides of the cylindrical restraint 160. The restraint 160 is shown as an inflatable cuff which can provide resilience, yet support various members or devices. The cuff comprises an internal membrane 164 and an external membrane 166 forming an annular compartment 168 for containing a pressurized fluid, such as air. Exemplary uses of such a cuff include elbow joints of a pressure suit or a splint or brace to be worn by around a weak or injured joint. The cuff can be made to provide sufficient structural support for to allow a person to stand on an injured knee, yet promote flexion of the knee when commanded, thereby aiding rehabilitative therapy of the joint Alternatively, the restraint may include only a single membrane and contain pressurized fluid throughout the entire compartment therein. Such a member might be beneficial as a load bearing member in a structural assembly, such as an inflatable building, or a non-supported beam.

Figure 16:
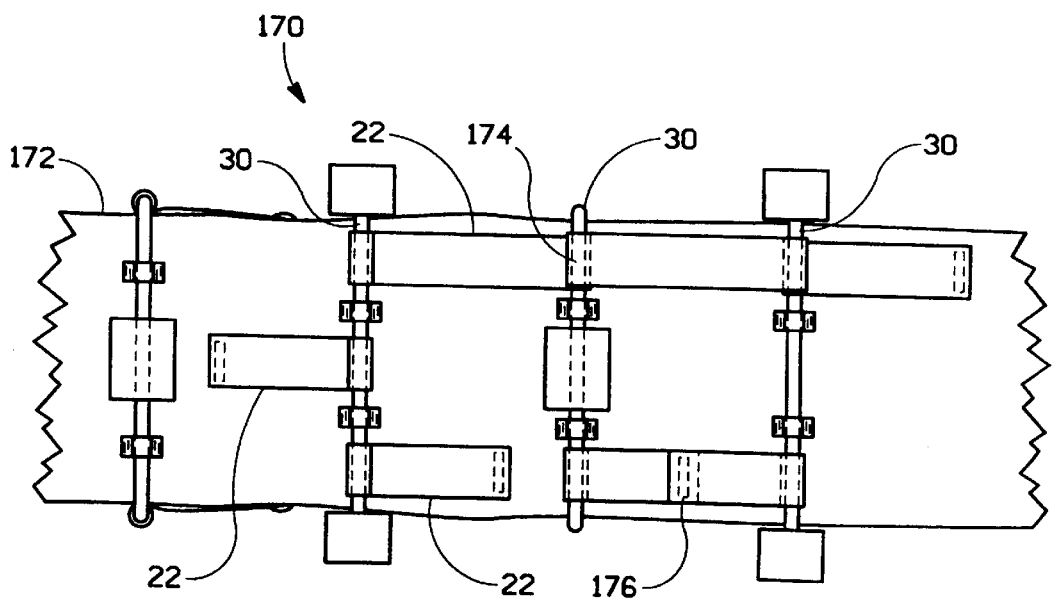
FIG. 16 is an array of staggered actuators providing an omni-directional joint.
Figure 17A:
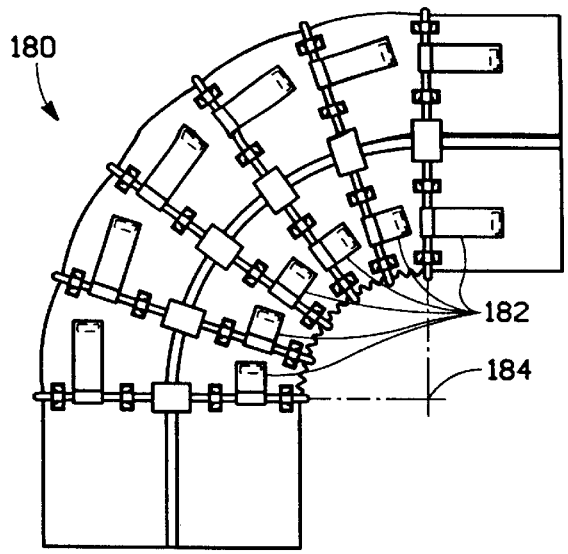
FIGS. 17A, 17B and 17C are schematic side views of a bi-directional actuator array, such as that of FIG. 14, illustrating various positions that are obtainable.
Figure 17B:
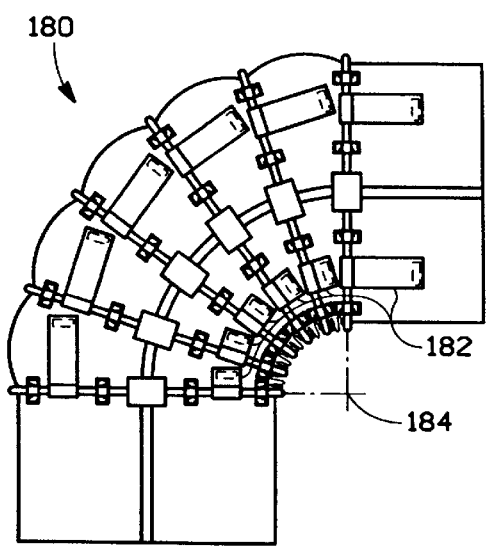
Figure 17C:
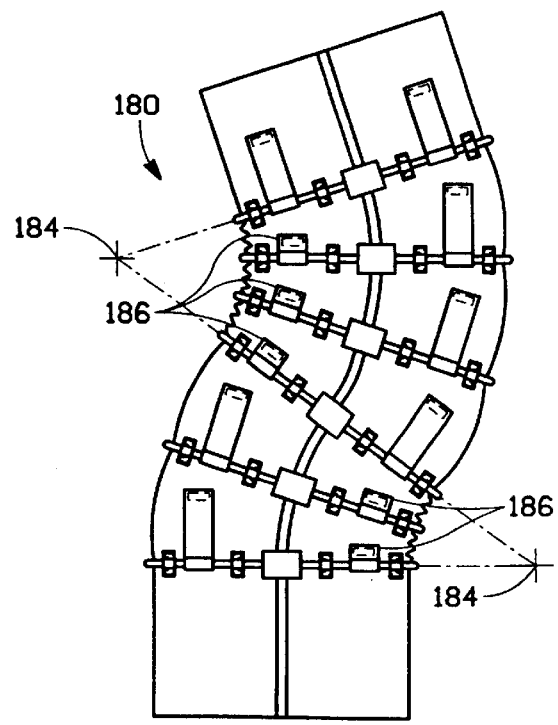

FIG. 16 is an array of actuators having staggered panels 22 providing an omni-directional joint 170. By placing actuators at various radial positions about a cylindrical restraint 172, the joint can be flexed in any direction. An omni-directional joint should include no fewer than three actuators spaced 120 degrees apart, but preferably includes at least four actuator spaced 90 degrees apart. By activating adjacent actuators simultaneousely, and perhaps to different percentages of full actuation, it is possible to direct the joint in a radial direction falling somewhere between the two actuators. Furthermore, controlled sequential use of the actuators can provide a rolling motion similar to that characteristic of the neck or wrist. FIG. 16 also illustrates that the flexible panels or cords 22 may be attached to more than one drive roller 30, such as in an over/under pattern shown at point 174. Additionally, the panels 22 may be attached at their mid points, as shown at point 176. FIGS. 17A, 17B and 17C are schematic side views of an omni-directional joint 180 actuator array illustrating three of the various positions that are obtainable. The omni-directional joint 180 is comprised of six rows of actuators having four actuators 12 (two on back side are not shown)disposed at 90 degrees around the perimeter of the cylindrical restraint In FIG. 17A, the actuators 182 on the right side of the joint have been partially flexed to provide a smooth bend having a bend center 184 that is located away from the joint. Alternatively, FIG. 17B shows the same omni-directional joint 180 with the same actuators 182 fully flexed to provide a tight bend having a bend center 184 located closer to the internal corner. Through the use of computer control it is possible to provide a joint that is disposable at any desired bend radius. Furthermore, FIG. 17C shows bow individual actuators 186 on each side of a joint may be actuated in order provide multiple bend centers 184 on opposed sides of the joint. It should also be recognized that the actuator systems described herein could be controlled to provide almost infinite geometric configurations, limited primarily by the actuator spacing and the diameter of the cylindrical restraint.

Figure 18:
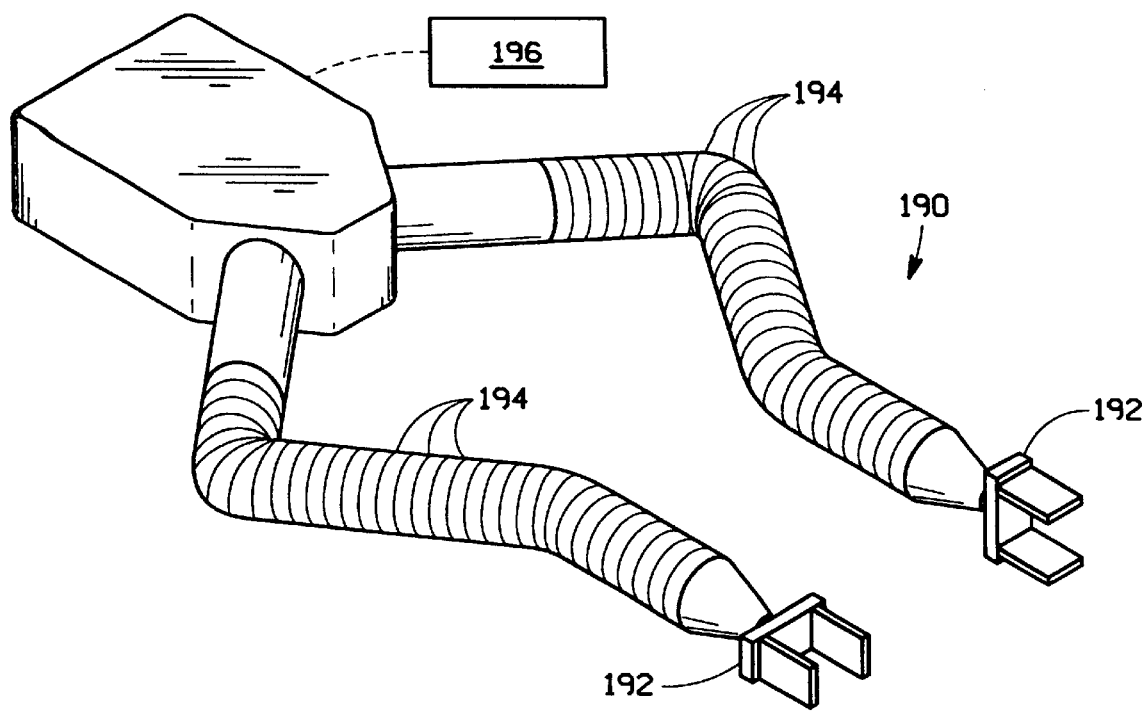
FIG. 18 is a pair of robot arms comprised of a bi-directional or multi-directional pressurized joint.

FIG. 18 is a pair of robot arms 190 comprised of a bi-directional or multi-directional pressurized joint. Each robot arm preferably includes an unobstructed passage therethrough for mechanical or electronic components to reach the end effector 192. The number and placement of actuators at points 194 can be infinitely varied. Each actuator can be individually controlled by a computer 196 and the overall movement of the arm 190 can be optimized for each task. These robot arms allow easier access in donfined spaces and can be made to avoid collisions with adjacent objects. A robot arm of this type is compliant (it gives when bumped) so as not to injure people or damage objects in its path. A compliant robot arm would be desirable for robots that assist humans in space and on earth, such as a personal assistant for the elderly or handicapped.

The cuff-type joint or robot arm allows for the passage of fluids, i.e. gases or liquids, through the center of the arm and out the end effector 192, such as a nozzle. This feature may be useful in spray painting, fire-fighting, aircraft deicing, and the like.

The actuators of the present invention may also be used in entirely different contexts to flex resilient coverings. For example, inflatable structures contructed of pressurized membranes may be shaped like animals, fish, people or the like for use as animated characters in movies, museums or other entertainment media. The actuators many be disposed to provide realistic, life-like motions of various parts.

Figure 19:
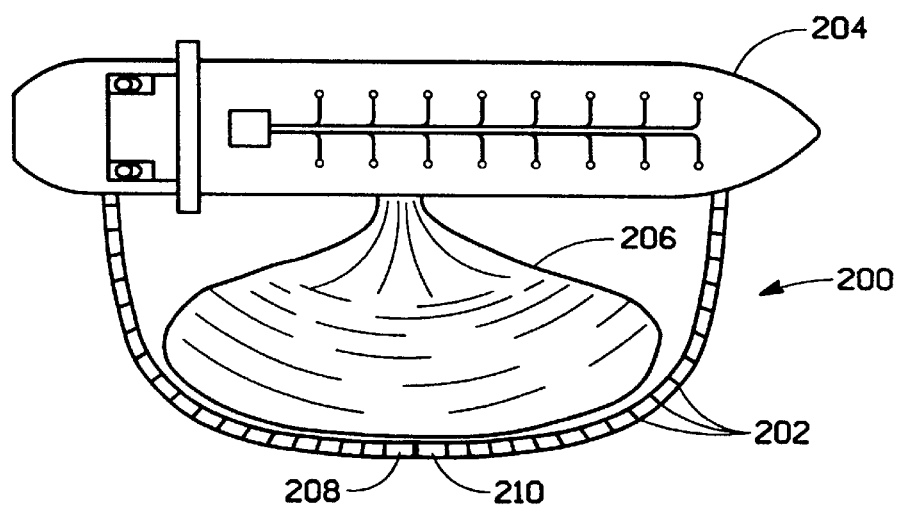
FIG. 19 is a floating boom system that includes multiple actuators along its length to provide articulation of the boom from a remote location, such as a ship.

FIG. 19 is a floating boom system 200 that includes multiple actuators 202 along its length to provide articulation of the boom from a remote location, such as a ship 204. Rapid deployment of the booms can contain an oil spill 206 adjacent the ship. Such booms can be made to self-deploy from a leaking ship, completely surrounding the spill without human assistance. The booms would include the retracting members 202 along its length to direct the ends 208, 210. Preferably, the booms would meet and automatically couple ends 208, 210 together to surround the spill 206 quicker than any other method. It is anticipated that the booms 200 could contain oil recovery devices which vacuum or skim the oil from the surface and feed it back to another container or vessel.

While the foregoing is directed to the preferred embodiment of the present invention, other and further embodiments of the invention may be devised without departing from the basic scope thereof, and the scope thereof is determined by the claims which follow.

What is claimed is:

1. An actuator in combination with a resilient restraint for flexing a flexion region of the resilient restraint, comprising:

a power assisted drive member secured in a fixed relationship with an anterior surface of the resilient restraint, the drive member having an axially rotatable drive roller extending over the anterior surface of the resilient restraint, the flexion region and resilient restraint having flexibility permitting the resilient restraint to bend anteriorly at the flexion region; and a flexible member having a first end coupled to an anterior surface of the resilient restraint, a second end affixed to the drive roller, and a middle portion crossing the anterior surface of the flexion region, the drive member comprising means for axially rotating the drive roller for winding a portion of the flexible member around the roller for drawing the drive member and a portion of the flexible member affixed thereto in a first direction toward the second end of the flexible member, drawing the second end of the flexible member and a portion of the resilient restraint affixed thereto in an opposite, second direction and across the anterior surface of the resilient restraint and toward the drive member, and causing the flexible restraint to bend anteriorly at least partially around the flexion region and the drive roller.

2. The actuator of claim 1, wherein the first end of the flexible member is coupled to the restraint adjacent an edge of the flexion region.

3. The actuator of claim 1, wherein the drive member is secured to the restraint adjacent an edge of the flexion region.

4. The actuator of claim 1, wherein the drive member and the first end of the flexible member are each coupled to the restraint adjacent opposed edges of the flexion region.

5. The actuator of claim 1, wherein the drive member is a retracting member.

6. The actuator of claim 1, wherein the flexible member is a fabric panel.

7. The actuator of claim 1, wherein the flexible member is a cord and the drive member comprises a sheath.

8. The actuator of claim 1, wherein the drive member is secured to the restraint.

9. The actuator of claim 1, wherein the drive member is secured to the restraint by a pair of hubs.

10. The actuator of claim 4, wherein the drive member comprises a motor.

11. The actuator of claim 1, wherein the resilient restraint is a portion of a glove. and wherein the anterior surface of the restraint is the palm side of the glove.

12. The actuator of claim 1, wherein the restraint forms a continuous barrier over the flexion region.

13. The actuator of claim 12, wherein the restraint is a glove.

14. The actuator of claim 12, wherein the restraint is internally pressurized.

15. The actuator of claim 1, wherein the resilient restraint is a portion of a glove, and wherein the anterior surface of the restraint is the palm side of the glove.

16. An actuator in combination with a resilient restraint for flexing a flexion region of the restraint, comprising:

a power assisted drive member coupled to an anterior surface of the restraint; and a flexible member having a first end terminating at and secured in a fixed relationship with the anterior surface of the restraint, a second end coupled to the drive member, and a middle portion crossing an anterior surface of the flexion region, the drive member comprising a drive roller mechanism affixed to the second end of the flexible member for drawing the drive member and the first end of the flexible member toward each other and drawing the flexible member across the anterior surface of the flexion region for flexing the restraint in an outward, anterior direction about the flexion region and about the drive roller mechanism.

17. The actuator of claim 16, wherein the drive member is a retracting member.

18. The actuator of claim 17, wherein the flexible member is a fabric panel.

* * * * *